L. C. RAYMOND.
INSTRUMENT FOR USE IN MEASURING AND PLOTTING LAND AREAS.
APPLICATION FILED JAN. 24, 1912.

1,050,393.

Patented Jan. 14, 1913.

2 SHEETS—SHEET 1.

WITNESSES

INVENTOR
Lionel C. Raymond.
By
His Attorney.

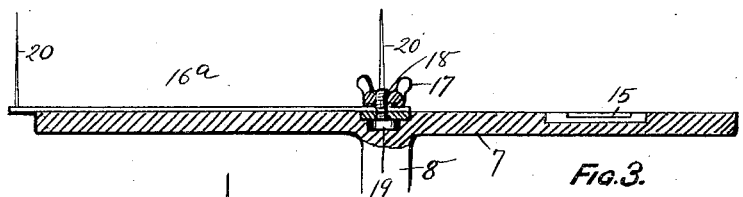
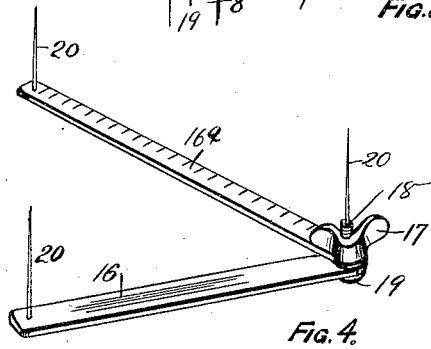
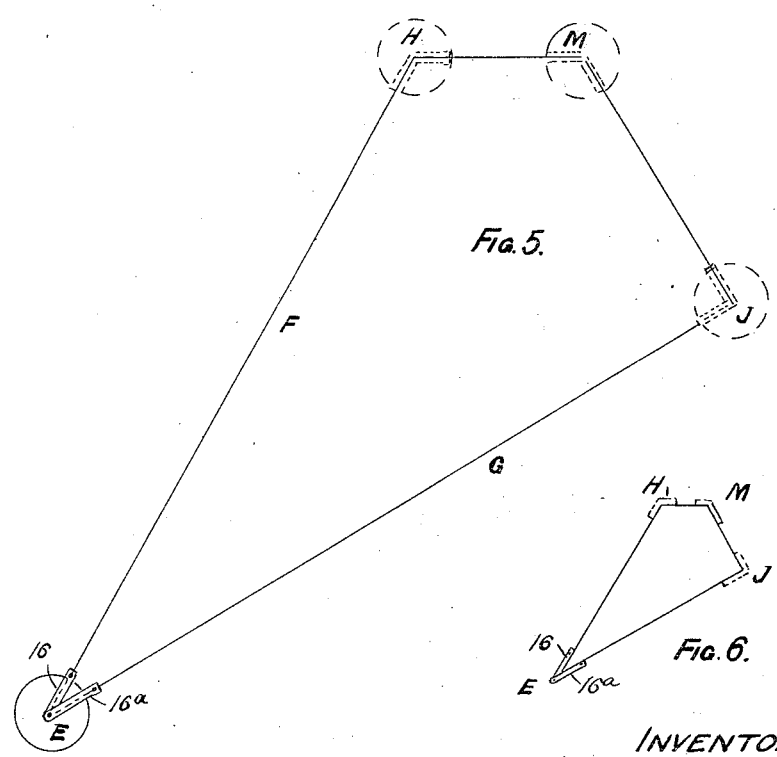
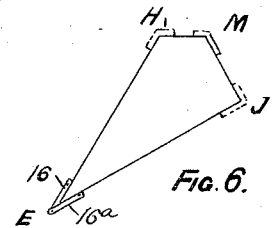

UNITED STATES PATENT OFFICE.

LIONEL CHARLES RAYMOND, OF GLENBROOK, BLUE MOUNTAINS, NEW SOUTH WALES, AUSTRALIA.

INSTRUMENT FOR USE IN MEASURING AND PLOTTING LAND AREAS.

1,050,393.  Specification of Letters Patent.  Patented Jan. 14, 1913.

Application filed January 24, 1912. Serial No. 673,240.

*To all whom it may concern:*

Be it known that I, LIONEL CHARLES RAYMOND, a subject of the King of Great Britain and Ireland, resident of Glenbrook, Blue Mountains, in the State of New South Wales, in the Commonwealth of Australia, but temporarily residing at Nausori Mill, Rewa River, Fiji, have invented certain new and useful Improvements in Instruments for Use in Measuring and Plotting Land Areas, of which the following is a specification.

This invention provides a simple instrument for readily determining the relative positions of the various points (and of the straight lines joining them) of the boundaries—irregular or otherwise—of any block of land, in short for traversing such boundaries, for expeditiously and accurately transferring such determinations to paper on the spot in the form of a plat or outline map; and for marking off on such plat according to proportionate scale the length of each boundary line as determined by actual measurement on the ground.

The whole of the above manipulations form a continuous and speedy operation and constitute a permanent record on paper of the shape and size, on a reduced scale, of the block of land traversed, from which the superficial area may be calculated from scale measurement applied to the plat after dividing the latter by lines if necessary, by triangulation or trapezoidal methods.

As the uses of the instrument do not extend to the determination of angles, no knowledge is necessary of the meaning of the term "bearings" as expressed in degrees, minutes and seconds or of the complicated and technical calculations consequent upon their use and for which the special training of the professional engineer or surveyor is required.

The construction of the instrument in its simplest form and its mode of application are illustrated in the accompanying drawings in which:—

Figure 1:
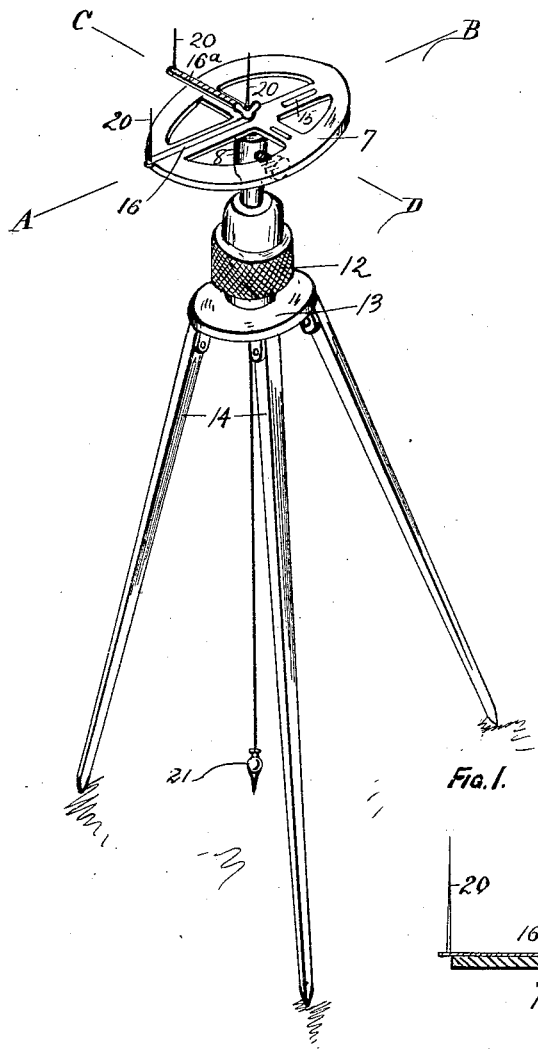
Figure 2:
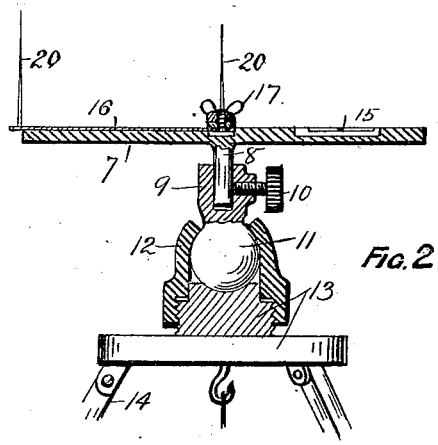

Figure 1 is a perspective view of the instrument complete; Fig. 2 is a sectional elevation on line A. B. of Fig. 1 on an enlarged scale; Fig. 3 is a sectional elevation on line C. D. of Fig. 1 on a still further enlarged scale; Fig. 4 is a perspective view of a pair of removable sighting arms; Fig. 5 is a plan of an irregular block of land showing the application of the instrument, and Fig. 6 is a plat or plan of such block of land on a reduced scale as plotted by means of the instrument.

A circular disk or skeleton platform 7 is revolubly mounted by means of its pin or stem 8 in a socket 9 provided with a thumbscrew 10 in order that rotation may be prevented as desired or required. The socket 9 forms part of a ball-joint consisting of a ball 11 and a clamping-nut 12 screwing on to the crown 13 of a tripod 14 or other support. The platform is provided upon its upper surface with two spirit levels 15. 15. set at right angles to each other in order that the platform may be set perfectly level with the plane of the horizon, in which position it may be fixed by means of the clamping-nut 12.

The sighting and plotting device consists of a pair of mutually pivoted scale arms 16. 16ª preferably of equal length (conveniently about one foot) each consisting of a strip of metal (or other material) having truly parallel edges, and capable of being clamped together in any relative position by means of the wing-nut 17 on the screw-pin 18, the flat head 19 of the latter being designed to fit within a depression in the exact center of the platform and thus insure the concentricity of the pivotal point of the arms with the platform. One of the arms 16 is sunk flush with the surface of the platform in a groove (see Figs. 1 and 2) so that it is held in a fixed radial position while the other is free to be moved around to any position. The fixed arm may be further secured by steady pins if desired.

On the central pivot-pin 18 and at or near the extremity of each arm are erected truly perpendicular needle sights 20. 20., all so arranged that the line of sight from the central to either of the outer sights is truly parallel to the edge of the arm. An extension piece (or pieces) is provided to fit on to any of the needle sights to increase the vertical length thereof when working up or down steep slopes.

Provision is made for the suspension beneath the crown 13 of a plumb-bob 21 in order that the erection of the instrument vertically over any desired point may be accurately adjusted.

I will now describe the use of the instrument in traversing a block of land such as is depicted in Fig. 5 and the transference to paper of the determinations arrived at as shown in the plat Fig. 6.

The instrument is erected (as shown in Fig. 1) at E (Fig. 5) directly over the intersection of the boundary lines F and G; the platform is then leveled, and clamped by means of the clamping-nut 12. The platform is now rotated until a sight taken along the arm 16 is in line with the point H, and is then secured in that position by the thumb-screw 10. The arm 16ª is then rotated about the center pin 18, a sight taken thereon to point J, and the two arms locked in their relative positions by the wing-nut 17. The arms are now removed from the platform, laid on the paper (the platform forming a table for the purpose if desired) and the angle between lines F and G plotted thereon by ruling lines along the inner edges of the arms. The respective lengths of the lines F and G having been determined by actual measurement, the corresponding lines on the plat (Fig. 6) may be plotted to scale. For this purpose it is convenient to have one (or both) of the arms graduated to a convenient scale as shown in Figs. 1 and 4.

So much of the operation having been completed, the instrument is erected at point H or J, a back sight taken along the fixed arm 16 toward E and the free arm 16ª sighted to M. The angle so obtained is transferred to the plat as before and the operation repeated until a correct plat or plan of the block of land is obtained from which the area may be computed by any convenient method.

It will be understood that in cases where the point of intersection of the boundary lines of a block of land is occupied by a fence-post or other obstruction, false sighting points must be provided and the sight lines taken parallel to the actual boundary lines either inside or outside the block. The angles thus determined are correct but the lengths of the lines must be measured on the actual boundaries or allowance made for the differences.

What I claim is:—

1. An instrument of the nature and for the purpose set forth consisting of a horizontally disposed disk or platform rotatably and adjustably mounted upon a suitable support and provided with a pair of mutually pivoted radial sighting members detachably pivoted at the center of the said disk; one of the said sighting arms being retained in a fixed radial position while the other is free to rotate in a horizontal plane; and means for clamping the said arms in any relative position; all substantially as herein described and illustrated in the accompanying drawings.

2. In an instrument of the nature and for the purpose set forth, the combination of a horizontally disposed disk or platform with a pair of mutually pivoted radial sighting members detachably pivoted at the center of the said disk and provided with means for securing the same in any relative position; all substantially as herein described and illustrated in the accompanying drawings.

3. In an instrument of the character described, the combination of a supporting stand, a rotatable and adjustable disk or platform mounted thereon, means for clamping the said disk in position, a pair of sighting arms detachably pivoted at the center of the disk, designed to be clamped in any relative position, and provided with a common back-sight at the pivotal point and each having a fore-sight at its other end, one of the said arms being designed to be retained in a fixed radial position while the other is rotatable in a horizontal plane, substantially as shown and described.

Signed at Nausori, Fiji, this twenty second day of November, 1911.

LIONEL CHARLES RAYMOND.

Witnesses:
H. D. UPTON,
W. D. KIRWAN.